United States Patent [19]

Burkwall, Jr. et al.

[11] 4,251,556

[45] Feb. 17, 1981

[54] PET FOOD WITH CASEINATE REPLACEMENT

[75] Inventors: Morris P. Burkwall, Jr., Barrington; Joseph C. Leyh, Jr., Cary, both of Ill.; John G. Reagan, Kent, Wash.

[73] Assignee: The Quaker Oats Company, Chicago, Ill.

[21] Appl. No.: 959,641

[22] Filed: Nov. 13, 1978

Related U.S. Application Data

[60] Continuation of Ser. No. 749,814, Dec. 13, 1976, which is a division of Ser. No. 578,729, May 19, 1975, abandoned.

[51] Int. Cl.$^2$ .............................................. A23K 1/10
[52] U.S. Cl. .................................. 426/332; 426/335; 426/321; 426/641; 426/656; 426/661; 426/657; 426/805

[58] Field of Search ................ 426/89, 285, 274, 656, 426/661, 805, 332, 335, 321, 641, 657; 260/112, 119, 233.3 R

[56] References Cited

U.S. PATENT DOCUMENTS

| 3,380,832 | 4/1968 | Bone | 426/805 |
|---|---|---|---|
| 3,883,672 | 5/1975 | Bone et al. | 426/311 |
| 3,885,052 | 5/1975 | Starr | 426/250 |
| 3,917,877 | 11/1975 | Kumar et al. | 426/656 |
| 3,930,058 | 12/1975 | Kumar et al. | 426/656 |

*Primary Examiner*—Hiram H. Bernstein
*Attorney, Agent, or Firm*—Charles J. Hunter; Mathew R. P. Perrone, Jr.

[57] ABSTRACT

A pet food is manufactured by at least partially replacing sodium caseinate or other caseinate binder with a combination of a vegetable protein, and an amylaceous material.

10 Claims, No Drawings

PET FOOD WITH CASEINATE REPLACEMENT

CROSS REFERENCE TO RELATED APPLICATIONS

This application is a continuation of application Ser. No. 749,814, filed Dec. 13, 1976, which application is a divisional of application Ser. No. 578,729, filed May 19, 1975, now abandoned.

BACKGROUND OF THE INVENTION

This invention relates to foods and more particularly to an animal food utilizing a vegetable protein-starch or flour combination to replace a casein component of the animal food.

Within the class of foods known as pet foods, there are three basic subdivisions: (1) dry pet food containing less than about 15% moisture; (2) semi-moist pet food containing about 15% to about 50% by weight moisture; and (3) moist pet foods containing in excess of 50% moisture. The moisture is determined by considering both the water present in the final product and the water combined with the various components that make up the final product. In general, the dry pet food tends to be the most stable and requires no special handling or packaging upon distribution. The semi-moist pet food tends to be less stable than the dry pet food and requires a more careful packaging system. However, the semi-moist pet food requires no refrigerated storage, and tends to be microbiologically and bacteriologically stable due to the presence of various stabilizing agents. The moist pet food requires stringent canning conditions. In fact, the moist pet food is canned and sterilized by retorting in the usual manner. When the can is opened, the pet food not consumed must be refrigerated to preserve it. Thus, it may be seen that the dry pet food is the most stable pet food; the semi-moist of medium stability and the moist of lowest stability. When considering palatability, generally speaking the moist pet food tends to be the most palatable and the dry pet food tends to be the least palatable. The semi-moist pet food falls somewhere in between the moist and the dry pet food as to palatability. It follows that both as to palatability and stability the semi-moist pet food ranks in between the dry and the moist pet food. This ranking permits the semi-moist pet food to provide both shelf stability and palatability. In other words, a pet owner using a semi-moist pet food has fewer problems storing a pet food which his pet will eat.

The advantages of a semi-moist pet food thus becomes obvious. In semi-moist pet foods and other processed foods, casein and casein derivatives such as sodium caseinate provide a highly suitable material. This material is both a good binder, and a good extrudable material. Furthermore, this material has such a high protein content, that it is used as a standard for determining or measuring protein quality of other protein-containing materials. So, in addition to the processing advantages of using caseinate, there is also a nutritional advantage due to the protein provided thereby. It thus becomes obvious why this material is so widely fed in the food processing art and especially in the pet food art. However, the pricing of of casein and derivatives thereof such as sodium caseinate are very high due to the economic conditions. This price is so high, that it is economically unfeasible to use the amount of casein in pet foods that are currently being used. It follows that it is desirable to develop a replacement for at least some of the casein in order to bring down product cost.

The unique qualities of casein salts—such as for example sodium, calcium, magnesium, ammonium, and potassium caseinate—render them difficult to replace. Not only must the replacement provide protein and processability, the appearance and flavor of the product must be substantially maintained. For example, it is customary to extrude semi-moist pet foods. Specifically, semi-moist pet foods containing caseinate derivatives are easily extrudable. It follows that the replacement for this component should also provide easy extrudability for the product in order to avoid substantial changes in machinery and manufacturing equipment. The protein level of the replacement must remain high and the palatability of the product containing the replacement must remain substantially the same.

Thus it may be seen that while costs have made casein and its derivatives an unacceptable component of a pet food, it is nevertheless difficult to replace a product component providing so many advantages.

SUMMARY OF THE INVENTION

Therefore, it is an object of this invention to provide an improved pet food of the semi-moist category.

It is a further object of this invention to provide a palatable, semi-moist pet food.

It is a still further object of this invention to provide a stable semi-moist pet food.

Yet a further object of this invention is to provide a semi-moist pet food containing a binder.

Also an object of this invention is to provide a semi-moist pet food containing an extrudable binder.

Another object of this invention is to provide a semi-moist pet food having a high protein content.

Still another object of this invention is to provide a semi-moist pet food product having a low cost binder.

A further object of this invention is to provide a semi-moist pet food having a good processability.

A still further object of this invention is to provide a semi-moist pet food having a good appearance.

These and other objects of this invention are met by providing a semi-moist pet food having at least partial replacement of a caseinate binder in a semi-moist pet food with a combination of vegetable protein and an amylaceous binder and recovering the desired product.

DESCRIPTION OF THE PREFERRED EMBODIMENTS

A semi-moist pet food is manufactured by including in the process a vegetable protein in combination with an amylaceous ingredient to replace at least part of the more expensive caseinate binder customarily in semi-moist material.

A highly successful semi-moist pet food is disclosed in U.S. Pat. No. 3,380,832 to Bone and U.S. Pat. No. 3,765,902 to Charter. These patents produce a solid, semi-moist, marbled meat pet food. The product produced by the method disclosed therein is highly acceptable as a pet food. The above-mentioned patents are incorporated herein by reference because the method and product disclosed therein are substantially the same as the method and product disclosed in this application. The major improvement of this application over the cited patent is the replacement of the caseinate binder or casein binder in whole or in part with a soy protein, and an amylaceous ingredient. The soy protein and the amylaceous ingredient combine to make a less expensive binder which approaches the acceptability of the product using the casein or derivative binder.

A major constituent of the animal food is meat or meat by-products. By "meat" is meant the flesh of cattle, swine, sheep, goats, horses, whale, and other mammals, poultry and fish. The term "meat by-products" includes such constituents as are embraced by that term in the Definition of Feed Ingredients published by the Association of American Feed Control Officials Inc. The animal food of this invention comprises about 5% to about 50% by weight meat by-products or meat. Hereafter, the term "meat" includes both meat and meat by-products. Various types of meat can be mixed to form the meat portion of this animal food. Various mixtures of meat adjust the flavor of the animal food. An acceptable range of meat for this animal food includes 15% to 35%. The preferred range of meat for this product is from about 20% to about 30% by weight of the total product. This concentration of meat is the concentration that provides the most effective use of meat for palatability while at the same time being the most cost effective. The preferred meat by-products are light in color and include beef tripe, beef intestines, partially defatted beef tissue, partially defatted pork tissue, other light color by-products and mixtures thereof.

The moisture content of this product is about 15% to about 50% by weight, or preferably 20% to 35%. Above about 50% by weight the product is too sloppy and soupy to be formed into the desired shape. The moisture is provided in any suitable fashion—either by components of the product or water in any combination. For example, the meat or meat by-products contain a substantial amount of moisture and provide a portion or all of the moisture suitable when used in the product. Water can also be used to provide the moisture content of the product in whole or in part.

Sugar is also an important component of this particular pet food. By "sugar" is meant any edible sugar used in the food art. Substantial examples of suitable sugars for use in the food art are listed in U.S. Pat. No. 3,202,514 to Burgess, et al.—incorporated herein by reference. A suitable amount of sugar for use in this product ranges from about 10% by weight to about 35% by weight of the final product. The preferred range of sugar for use in the composition ranges from 15% to 25% by weight of the final product. While the broader ranges are operable for the purpose of this invention, the preferred range appears to be the most cost effective and provides an adequate palability.

Starch is also a critical component of this invention in that it has three important functions: providing a proper dough viscosity by avoiding having the dough be too tough, too soft, or too sticky; providing proper extrudate flow-ability so that the components of the dough meld together and avoid the rope-like structure indicative of a poor flow and the overflowing of the cooling belts if the dough is too free flowing; and provide a proper setting of the extrudate, so that the dough is neither too soft, nor too sticky to interfere with dicing problems.

In order to adjust dough viscosity and stickiness, pregelatinized starch or flour is suitable. Pregelatinized wheat flour, pregelatinized regular corn starch, and pregelatinized modified corn starch are the most suitable for modifying dough viscosity. However, almost any pregelatinized flour, cereal mill, or starch aids in the water absorption which provides the suitable dough viscosity.

As to extrudate flowability, the following starches are preferred: amylopectin corn starch, acid hydrolyzed corn starch, acid hydrolyzed cross-linked corn starch, and modified high amylose corn starch. While these starches are preferred, any standard edible starch whether or not modified, and other hydrolyzed acid starches or flours are suitable for improving extrudate flowability.

A particularly suitable starch that aids in the setting of the extrudate includes lightly acid hydrolyzed (thin-boiling) corn starch having a fluidity value of 65 or less, cross-linked acid hydrolyzed corn starch, and cross-linked regular corn starch. Regular amylopectin starch and regular corn or wheat starch whether modified or not is also a suitable starch to aid in setting up the extrudate.

As can be seen some of the above starches can have two or more functions and certain starches can be modified to have any or all of these functions. Thus, the above-referenced starches, can be used singly or in any reasonable combination to form a system of starches or starch systems which is usable as part of the composition suitable for replacing casein or sodium caseinate or other casein derivatives in foods.

While it is possible for one especially tailored starch to provide all of the desired functions of the starch system for the purpose of this invention, it is generally preferred to use at least two starches to meet all of the desired functions. The multi component starch system is preferred because of lower cost for the starch system. About 4 to about 25 percent by weight of the final product is generally comprised of a starch system. More preferably, the starch system is from about 8 to 20 percent by weight of the final product. Most preferably, the desired concentration of starch system is from about 10 percent to about 15 percent by weight of the final product.

Vegetable protein is also added to the composition in an amount ranging from 1% to about 26% by weight of the final product. This vegetable protein is combined with the added starch system to provide a means for replacing the caseinate in the food. These vegetable proteins replace the casein derivatives up to and including 100% by weight of the casein derivative. The perferred vegetable protein for use in this pet food is soy protein isolate (approximately 90% protein). A chemically or enzymatically modified soy protein isolate will also work equally well. For example, an alkali modified soy protein isolate in combination with starch or flour can completely or partially replace sodium caseinate or other casein salts which is a heretofore essential ingredient in a substantial number of semi-moist pet foods.

Various other common additives from 0% to about 25% may also be added to the pet food. Fat is usually added in an amount from 0% to 12% by weight of the final product depending upon how much is naturally contained in the meat. The fat may be of either animal or vegetable fat. A preferred fat for use in this pet food is an animal fat exemplified by prime steam lard, tallow, and choice white grease. Dicalcium phosphate and other minerals are incorporated in the pet food along with natural and synthetic vitamins for the purpose of making the product nutritious to the pet. Vitamins, minerals, colorings and flavors are generally present in the pet food also in the amount of about 0 percent to about 6 percent for the purpose of nutrition and overall appearance.

The stabilizer for the semi-moist pet food of this invention comprises at least one polyhydric component, at least one antimycotic, and at least one sugar. The sugar is as above defined. The antimycotic is generally an edible antimicrobial acid salt present in an amount of less than or equal to 1 percent. Typical edible acid salts include benzoates, parabans, propionates, acetates, and sorbates. Especially preferred is potassium sorbate. A typical polyhydric component includes:

| Tritols | Hexitols |
|---|---|
| glycerol | allitol |
|  | dulcitol |
| Tetritols | sorbitol (D-glucitol) |
| erythritol | L-glucitol |
| D-threitol | D,L-glucitol |
| L-threitol | D-mannitol |
| D,L-threitol | L-mannitol |
|  | D,L-mannitol |
| Pentitols | D-talitol |
| ribitol | L-talitol |
| Xylitol | D,L-talitol |
| D,arabitol | D-iditol |
| L,arabitol | L-iditol |
| Heptitols |  |
| glycero-gulo-heptitol |  |
| D-glycero-DOido-hepitol |  |
| perseitol |  |
| volemitol |  |
| Octitol |  |
| D-erythro-D-galacto-octitol |  |

Also included in the polyhydric components are propylene glycol, and 1,3-butanediol both of which are preferred either individually or in combination for the product of this invention.

A suitable process for preparing the pet food of this invention is described in the above-referenced patents to Bone and Charter. Basically, the meat is ground and emulsified. Separately the dry ingredients are blended. To the dry ingredients is added the required fat. Then, the meat, water and propylene glycol and sorbate is added to the dry ingredients in the fat. After mixing, a dough is formed. The dough is then extruded in a standard fashion. During extrusion, the dough is heated to about 220° F. to 260° F. in order to form a molten, flowable product. For marbled meat products, two separate doughs are formed and extruded as described in the above-referenced patent to Charter.

By following the Charter process, the extrudate is cooled on both sides. After removal from the belt the extrudate is allowed to cool further so that the temperature of the extrudate coming off the final cooling belt is under 110° F. After the extrudate is removed from the cooling belt it is appropriately treated for packaging. For example, the extrudate is cut into slabs and diced if desired.

In the following examples which are intended to illustrate without unduly limiting the invention, all parts and percentages are by weight unless otherwise specified.

EXAMPLE 1

The following table lists three different formulations. Formula A is the control using all sodium caseinate. Formula B replaces one half of the sodium caseinate with soy protein isolate and an appropriate starch system. Formula C replaces sodium caseinate with an alkali modified soy protein isolate and an appropriate starch system.

TABLE I

| Ingredient | A% | B% | C% |
|---|---|---|---|
| Beef tripe | 34.0 | 25.0 | 25.0 |
| Sugar | 28.8 | 24.5 | 24.5 |
| Sodium Caseinate | 12.0 | 6.0 | — |
| Soy Protein isolate | — | 6.0 | — |
| Alkali Modified soy protein isolate | — | — | 12.0 |
| Corn starch | 9.5 | 7.5 | 7.0 |
| Acid hydrolyzed starch | — | 7.5 | 7.0 |
| Pregelatinized wheat flour | — | 3.0 | — |
| Amylopectin starch | — | — | 4.0 |
| Propylene Glycol | 4.0 | 4.3 | 4.3 |
| Prime steam lard | 3.5 | 3.0 | 3.0 |
| Dicalcium phosphate | 3.1 | 3.1 | 3.1 |
| Iodized salt | 1.0 | 1.0 | 1.0 |
| Vitamins, minerals, color and flavors | 0.5 | 0.5 | 0.5 |
| Potassium chloride | 0.5 | 0.4 | 0.4 |
| Water | 3.0 | 8.0 | 8.0 |
| Potassium sorbate | 0.1 | 0.2 | 0.2 |
|  | 100.0 | 100.0 | 100.0 |

Each of these examples uses red color and is processed as in the Charter patent except that they are not marbled with a white portion. Examples B and C are each compared with control sample A in a paired comparison test using kennel-housed dogs. The test results given in Table II show the product acceptability is equal to or better than control product containing all sodium caseinate.

TABLE II

| Product | # Preferring | Average % consumed | T-Test |
|---|---|---|---|
| TEST 1 |  |  |  |
| Extruded pet food 6% Na Caseinate + 6% soy protein (H) | 212 | 66.4 | 10.92 99% significant |
| Extruded pet food 12% Na Caseinate (control) (A) | 136 | 34.6 |  |
| TEST 2 |  |  |  |
| Extruded pet food 12% Na Caseinate (control) (A) | 86 | 48.9 | not significant |
| Extruded pet food 0% Na Caseinate (C) | 93 | 51.1 | 0.49 |

EXAMPLE 2

The process of Example 1 is repeated but for this exception. The vitamins, minerals, color, and flavors component of Example 1 is replaced with a component comprising vitamins, flavors, and edible titanium dioxide to provide a white coloring for the material. A suitable white rubbery textured product is obtained.

EXAMPLE 3

The products of Examples 1 and 2 are combined in a 4 to 1 ratio (red to white) to produce a suitable marbled meat pet food in the process as described by Charter in above referenced patent.

Having now fully disclosed the invention, what is claimed and desired to be secured by Letters Patent of the United States is:

1. A substantially solid, semi-moist animal food comprising:

(a) from about 5% to about 50% meat or meat by-products;
(b) from about 15% to about 50% moisture content:
(c) from about 10% to about 35% sugar;
(d) from about 1% to about 10% of at least one polyhydric component;
(e) up to about 0.5% antimycotic;
(f) from about 4% to about 25% of a starch system;
(g) 0% to about 25% additives; and
(h) about 7.5% to about 25% of a protein system, the protein system comprising 1% to 25% of a non-alkali modified soy protein isolate and 0% of a casein salt, all percentages being based on the weight of the food; wherein the non-alkali modified soy protein isolate completely replaces the casein salt with regard to protein content, and wherein the starch system and the non-alkali modified soy protein isolate combine to replace all functions of the casein salt.

2. The food of claim 1 wherein the additives are at least one selected from the group consisting of prime steam lard, dicalcium phosphate, iodized salt, vitamins, minerals, food coloring, flavoring, potassium chloride, and water.

3. The food of claim 2 wherein the meat by-product is at least one slected from the group consisting of beef tripe, beef intestines, partially defatted beef tissue, and partially defatted pork tissue.

4. The food of claim 2 wherein the amount of vegetable protein exceeds the amount of casein salt.

5. The food of claim 3 wherein the vegetable protein is at least one selected from the group consisting of non-alkali modified soy protein isolate.

6. The food of claim 1 wherein the meat comprises from about 15% to about 35% by weight, the sugar comprises from about 15% to about 25% by weight, the starch system comprises from about 8% to about 20% by weight, and the moisture content is 20% to 35% by weight.

7. The food of claim 6 wherein the meat comprises from about 20% to about 30% by weight.

8. The food of claim 7 wherein the sugar comprises from about 15% to about 25% by weight and the starch system comprises from about 10% to about 15% by weight.

9. The food of claim 8 wherein the soy protein isolate comprises from about 8% to about 15% by weight.

10. An improved, substantially solid semi-moist animal food of the type comprising from about 5 percent to about 50 percent meat or meat by-products; from about 15 percent to about 50 percent moisture content; from about 10 percent to about 35 percent sugar; from about 1 percent to about 10 percent of at least one polyhydric component; up to about 0.5 percent antimycotic; from about 4 percent to 25 percent of a starch system; from 0 to about 25 percent additives; and about 7.5 to about 25 percent of a protein system, said protein system comprising 0 to 25 percent of casein or a casein derivative; wherein the improvement comprises: completely replacing the casein or casein derivatives with non-modified soy protein isolate.

* * * * *